United States Patent [19]

Ryba

[11] Patent Number: 5,181,483
[45] Date of Patent: Jan. 26, 1993

[54] AUTOMATICALLY COUPLING FAN FOR AUTOMATIVE COOLING SYSTEMS

[75] Inventor: Anton Ryba, Bozen, Fed. Rep. of Germany

[73] Assignee: Harald Mair-Egg, St. Leonhard, Italy

[21] Appl. No.: 665,091

[22] Filed: Mar. 6, 1991

[30] Foreign Application Priority Data

Apr. 12, 1990 [DE] Fed. Rep. of Germany ....... 4011946
Nov. 8, 1990 [DE] Fed. Rep. of Germany ....... 4035510

[51] Int. Cl.⁵ .............................................. F01P 7/02
[52] U.S. Cl. ................. 123/41.12; 192/82 T
[58] Field of Search ................... 123/41.12; 192/58 B, 192/92 T

[56] References Cited

U.S. PATENT DOCUMENTS

| | | | |
|---|---|---|---|
| 1,820,035 | 8/1931 | Stokes | 123/41.12 |
| 2,005,468 | 6/1935 | Modine | 123/41.12 |
| 2,438,161 | 3/1948 | Greenlee | 123/41.12 |
| 2,652,816 | 9/1953 | Dodge | 123/41.12 |
| 3,053,363 | 9/1962 | Weir | 192/58 B |
| 3,103,308 | 9/1963 | Wolfram | 192/82 T |
| 3,792,697 | 2/1974 | Walter | 123/41.12 |
| 4,081,066 | 3/1978 | Ryba | 123/41.12 |
| 4,304,321 | 12/1981 | Wong | 192/82 T |

Primary Examiner—Noah P. Kamen
Attorney, Agent, or Firm—Keck, Mahin & Cate

[57] ABSTRACT

An automatically coupling fan for the cooling system of automobiles, comprising a thermostat, in the form of a gas-tight container with a solid and a flexible wall, containing a liquid whose steam temperature within a predetermined temperature range couples the fan to the drive shaft of the motor by means of a friction clutch, characterized in that the thermostat has the form of a metal bellows which turns along with the water pump shaft. The bellows dimensions are such that the water ring generated during rotation of the thermostat by to the centrifugal forces exerted on the thermostat filler largely remains outside of the effective bellows cross-section ($a_w$) and the fan is coupled in a predetermined temperature range almost exclusively by the filler steam pressure arising in the thermostat, or the filler quantity of the liquid medium in the thermostat is such that the water ring generated by the centrifugal forces working on the filler with the rotation of the thermostat in conjunction with the water pump shaft largely remains outside of the effective cross-section ($a_w$) of the metal bellows and the fan is coupled in a predetermined temperature range almost exclusively by the steam pressure arising in the thermostat.

8 Claims, 5 Drawing Sheets

AUTOMATICALLY COUPLING FAN FOR AUTOMATIVE COOLING SYSTEMS

BACKGROUND OF THE INVENTION

The invention relates to an automatically coupling fan for the cooling system of automobiles, comprising a thermostat formed by a gas-tight container with a rigid and a flexible wall, which thermostat contains a liquid whose steam pressure, in a preset temperature range, couples the fan to the drive shaft of the motor by way of a friction clutch.

Automobiles with combustion engines require fans to be positioned in the cooling system in order to remove heat in all driving conditions.

If the fan is rigidly connected to the motor—and in consideration of the fact that the expense in terms of fan performance quite considerable—measures are justified to reduce this expense.

In order to avoid the indicated disadvantages the prior art has long known a connection between the fan and the motor employing friction clutches or liquid slip clutches. Also employed is a fan drive with a separate electric motor, for those drive motors installed in a direction diagonal to the direction of travel. However, these designs are only partially satisfactory or are not at all satisfactory—since they are burdened with technical and operational disadvantages and disadvantages relating to cost.

An automobile fan of the type indicated at the outset is known to the prior art from DE-PS 26 35 896. In this fan the thermostat is at rest. Its coupling action is dependent on the temperature of the cooling air passing above it; the fan is coupled to the motor drive shaft within a critical temperature range as a function of the steam pressure of the boiling filler located inside of the thermostat. Coupling is performed by its flexible wall. The thermostat then runs along with the blades of the fan. The contact pressure between the thermostat and the matching fan clutch is reinforced by the centrifugal force of the liquid remaining in the thermostat.

The problem of the invention is to specify a design whose embodiment is particularly simple and cost-effective and which enables the fan to be controlled by the temperature of flow of either the cooling water or the cooling air.

This problem is solved by the invention, as indicated in the primary invention claim, in that the thermostat is configured as a metal bellows which rotates jointly with the shaft of the cooling water circulating pump, and the bellows dimensions are such that the water ring arising with the centrifugal forces exerted on the thermostat filler during rotation of the thermostat remains largely outside of the effective bellows cross-section, and in that the fan is coupled almost exclusively by the steam pressure of the filler arising within the thermostat in the predetermined temperature range; or in that—as specified in the secondary claim—the thermostat is configured as a metal bellows which rotates jointly with the shaft of the cooling water circulating pump, and the filler volume of the liquid medium within the thermostat is such that the water ring arising with the centrifugal forces exerted on the filler during rotation of the thermostat along with the shaft of the circulating pump remains largely outside of the effective cross-section of the metal bellows and in that the fan is coupled almost exclusively by the steam pressure arising within the thermostat in the predetermined temperature range.

Metal bellows manufacturers can provide the specialist with necessary information on the use of metal bellows and on the pressure that can be transmitted to the flexible wall of the metal bellows; likewise the effective bellows cross-section, as determined by the inner and outer diameters of the bellows. From this information it is possible to determine the effective quantity of filler needed for a given bellows—so as to thereby assure that the quantity of liquid filler will not cause centrifugal forces of such magnitude, in any of the operating phases, that the fan will be prematurely coupled to the circulating pump shaft.

However, the specialist can also determine the quantity of filler demanded by the pressure forces required for coupling—in order to achieve the necessary steam pressure within the predetermined temperature range, given a specific bellows volume. Bellows that meet the invention requirements can be identified from these magnitudes and from the measurement and data tables drawn up by bellows manufacturers.

In actual practice, the control of fan coupling as a function of the cooling water temperature is preferred; in previous designs, however, this has been possible only with a relatively high additional expense.

SUMMARY OF THE INVENTION

According to a preferred embodiment of the invention, this end can be achieved in a simple manner, namely in that the solid thermostat wall is connected in rigid fashion to the pump wheel and the flexible wall borders one end of a bar which is so positioned within the water pump shaft, configured as a hollow shaft, as to be movable in the axial direction and which rotates along with the water pump shaft, the other end of which bar is connected to a part of the fan clutch, while the matching clutch part is positioned directly on the fan. This means that the solid wall of the thermostat lies in the cooling water flow and the temperature of said flow activates fan coupling.

According to another preferred embodiment, the design principle according to the invention can also be applied to a thermostat resting in the flow of cooling air. Here the solid wall of the thermostat is exposed to the air coolant flow and the flexible wall is positioned on the water pump shaft so as to be move in a longitudinal direction. The solid thermostat wall is exposed to the coolant flow and the flexible wall couples the fan to the water pump shaft by means of the friction clutch within a predetermined temperature range.

The particular advantage of this embodiment rests in the fact that the predominant portion of the components can be injected in a simple fashion from thermoplastic material, with the result that the clutch can be produced in a highly economical fashion.

Design features for a simple and operationally secure configuration of the clutch mechanism are disclosed in the secondary claims, as well as in the following description of embodiment examples, as based on the diagrams.

BRIEF DESCRIPTION OF THE DRAWINGS

Shown are.

DETAILED DESCRIPTION OF THE INVENTION

Figure 1:
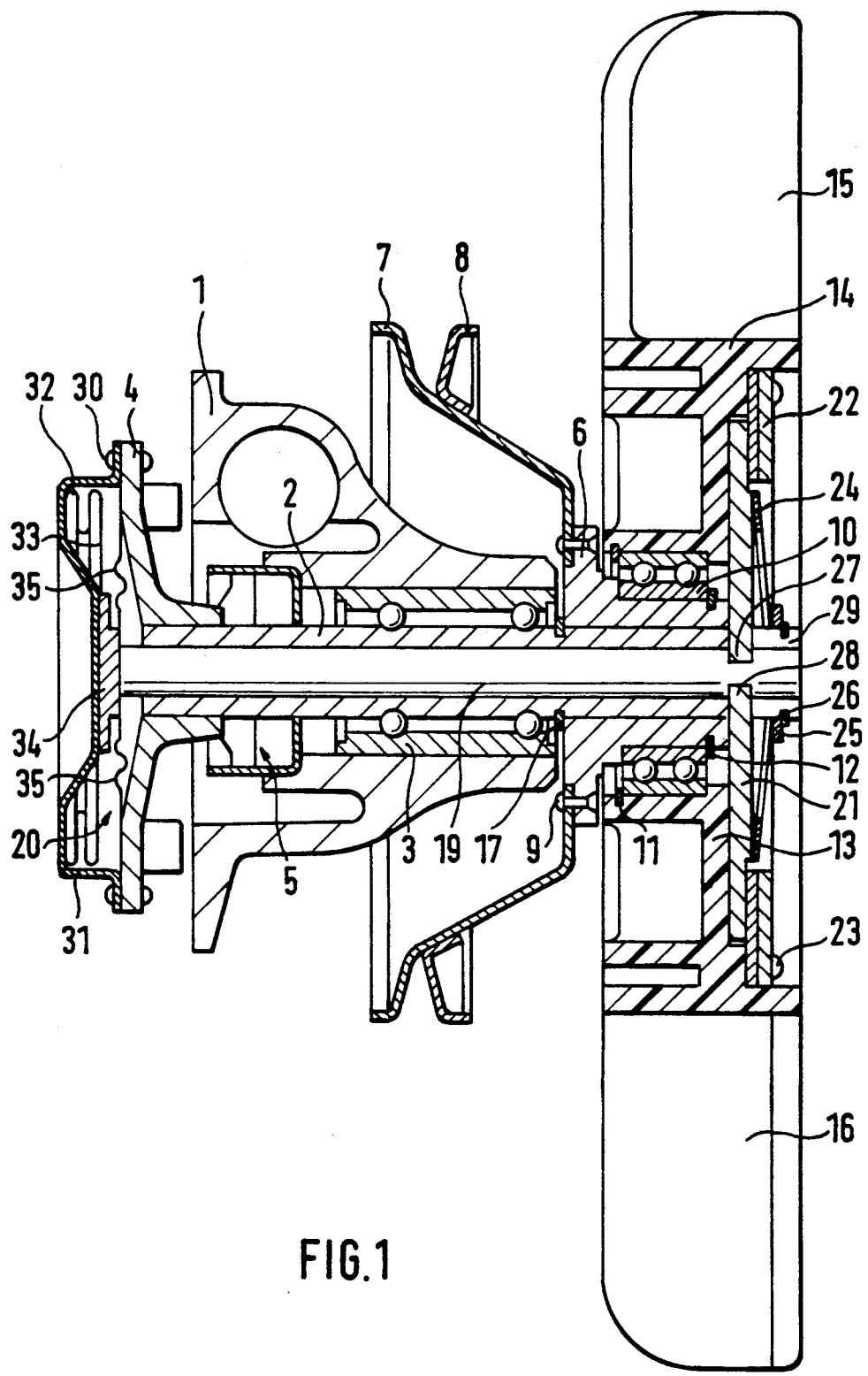
FIG. 1 an axial section of the automatic fan whose coupling action is dependent on the cooling water temperature.

The housing 1 of a cooling water circulating pump is connected to the automobile motor in a manner known to the prior art. The water pump shaft 2 is mounted in the housing 1 on ball bearings 3. The pump wheel 4 is pressed onto the front side of the water pump shaft 2. A shaft seal 5 separates the water space from the mounting part. Also pressed onto the water pump shaft 2 is a sleeve 6 into which a V-belt pulley formed from parts 7 and 8 is attached with rivets 9 to accommodate a V-belt (not shown) for connection to the motor shaft. The water pump shaft 2 is driven is this manner and the flow of the cooling water is thereby established.

Positioned on the sleeve 6 is one of the shells of the ball bearing 10 which supports the fan hub 13; the shell is secured against axial displacement by means of a snap ring 12. The opposite housing shells of the ball bearing 10 rest on the fan hub 13 and are secured there against axial displacement by means of a snap ring 12. This arrangement permits the fan, formed by the hub 13 and the outer part 14 which supports the blades 15 and 16, to freely rotate around the water pump shaft 2. A snap ring 17 secures the sleeve 6 against axial displacement. In the embodiment examples according to FIGS. 1 to 5 the fan parts 13 and 14 are produced as a single part from thermoplastic material. When necessary the fan parts 13 and 14 can be produced as a single part from thermoplastic material, [sic] permitting an especially cost-effective production. It is also possible to inject the liner for the housing of the ball bearing 10 at the same time.

Figure 2:
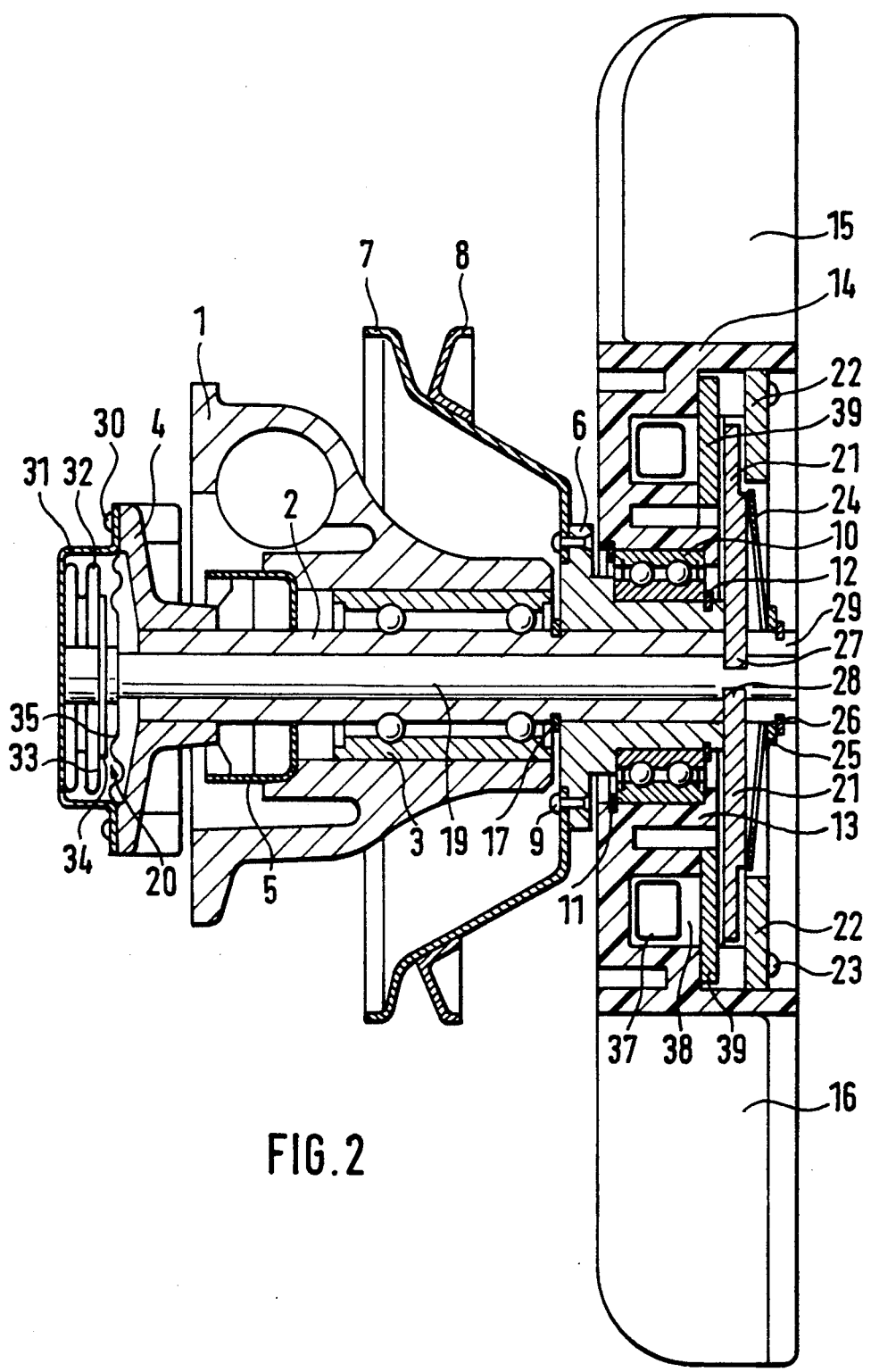
FIG. 2 an axial section of the fan according to FIG. 1, with a device installed in the fan hub to reinforce the coupling forces.
Figure 3:
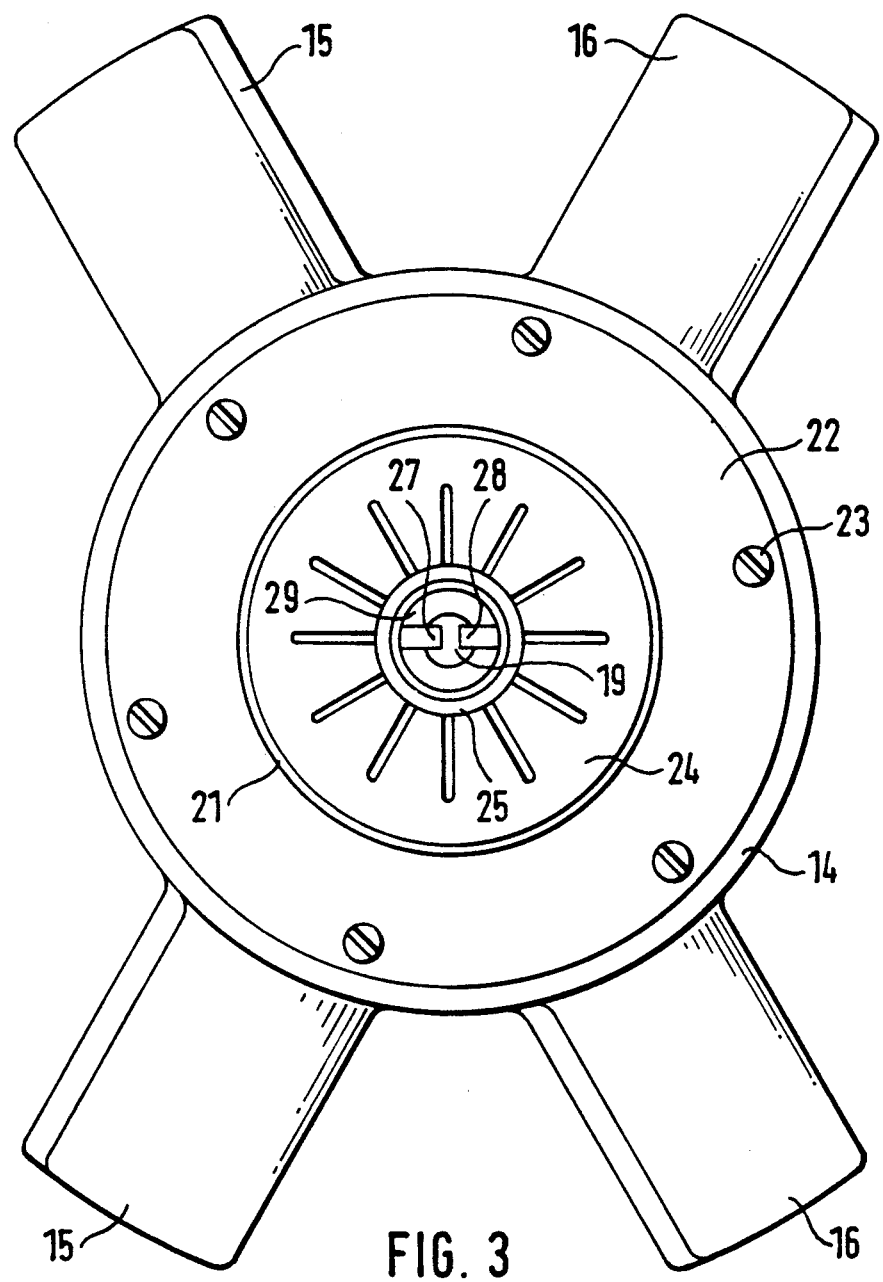
FIG. 3 a front view of the fan according to FIG. 1.

In the examples according to FIGS. 1 to 3 the water pump shaft 2 takes the form of a hollow shaft. A rod 19 is positioned in the shaft and in a way such as to permit axial motion. The front end of the rod 19 projects slightly beyond the water pump shaft 2 and terminates at the vertical plane of the outer surface of the pump wheel 4. The outer edges of the fixed shell 31 of a thermostat 20 are attached with rivets 30 to the outer surface of the pump wheel 4. The thermostat 20 thus rotates along with the water pump wheel 4. The thermostat 20 takes the form of a metal bellows, with a plurality of bellows shafts 32. The inner diameter of the bellows, as determined by the depth of the bellows shaft, is $d_1$mm. Its effective outer diameter is $d_2$mm. The effective bellows cross-section, according to bellows manufacturers, is thus calculated as: $a_w = \pi/12 \ (d_1^2 + d_1 \cdot d_2 + d_2^2) \ 10^{-2} (cm^2)$. The movable wall (diaphragm) 33 of the thermostat 20 is reinforced with a plate 34. The number of bellows shafts 32 is determined by the desired axial displacement of the movable wall 33 necessary for coupling. On an average it is between −2 to 4 mm.

The front end of the rod 19 rests tightly against the outside of the movable wall 33/34. To safely prevent leakage of cooling water, a slightly flexible plate 35 in the form of a shaft diaphragm is provided in the area of the front end of the rod 19.

At the opposite end of the rod 19 there is a friction disk 21 (see FIGS. 1-2), which passes through a slot 29 in the water pump shaft 2 and which is mounted in a form-fitting manner to the rod 19 by means of two studs 27 and 28. Axial movements of the diaphragm 33/34 of the thermostat 20 can thus be transmitted to the friction disk 21 by means of the rod 19.

A matching friction disk 22 is secured with screws 23 to the outer part 14 of the fan opposite the friction disk 21. The matching friction disk 22 represents the sealing plate for the fan.

To adjust the coupling temperature of the fan clutch 21, 22 there is a circular disk spring 24 that rests against the friction disk 21. The inner rim of the disk spring 24 is held to the water pump 2 by means of a ring 25 and a Seeger ring 26 to prevent axial displacement (see FIG. 3). The spring tension effects an axial displacement of the rod 19 by way of the friction disk 21 and thus works against the movement of the diaphragm 33/34 caused by the steam pressure of the filler within the thermostat. Only after overcoming the spring force exerted by the disk spring 24 does the friction disk 21 come into contact with the clutch part of the matching friction disk 22 and allow the torque to be transmitted to the fan.

Numerous filling mediums are known to the prior art for the thermostat employed here. Freons, particularly freon $CCl_3F$, have particularly proven themselves.

The design shown in FIG. 2 for an automatic coupling fan largely agrees with that shown in FIG. 1. Corresponding parts are therefore indicated with the same reference numerals and do not need to be described again. The structural differences of the embodiment according to FIG. 2 are limited to the inner and outer parts 13 and 14 of the fan. In the circular hub 13 of the fan, which encompasses the sleeve 6, there is a circumferential groove 38; inserted into said groove is a tube 37 filled with a liquid, e.g. water. As soon as the clutch formed by the friction disk 21 and the friction disk 22 is engaged due to sufficient axial displacement of the rod 19, and the fan begins to turn, the tube 37 filled with liquid also begins to turn. When the clutch is set in motion by the thermostat 20, the liquid is subjected to a centrifugal force, whose axial component presses a friction disk 39, which is formed-fitted to part 14 of the fan and which moves in the axial direction, against the back surface of the friction disk 21. Thus two frictional surfaces are at work in this embodiment, and the coupling force is increased.

The operation of the automatic coupling fan according to the invention as shown in FIGS. 1 to 3 is as follows:

The thermostat 20 configured as a metal folding bellows, with an axially movable diaphragm wall 33/34, has an outer diameter $d_2$ and an inner diameter $d_1$ determined by the depth of the bellows shaft. The filler employed is freon. The volume of the filler is such that when the thermostat 20 revolves in the cooling water, along with the water pump shaft 2 in the cooling water flow, the liquid medium gathers in the folds of the bellows shafts 32 and the center part of the bellows, which is approximately covered by the inner diameter of the effective area —provided by the formula $a_w = \pi 12 \ (D_1^2 + d_1 \cdot d_2 d_2^2) \ 10^{-2} (cm^2)$—, remains free of liquid medium. In this case no axially directed centrifugal force components take effect, even at the highest rpm of the water pump shaft 2.

Given a cooling water temperature of approx. 85° C—the operating range of the thermostat in the cooling water flow is between 70° and 90° C.—the steam pressure of the filler inside the bellows causes an axial displacement of the diaphragm 33/34 and thus the displacement of the rod 19 in the direction of the friction disk 21. The steam pressure of the filler, transmitted by the rod 19, overcomes the opposing force of the disk spring 24 and engages the clutch 21, 22. The fan will then rotate.

In the embodiment of the automatically coupling fan according to FIG. 2, the tube 37, which is located in space 38 of fan part 14 and is filled with liquid, is set in rotation with the onset of turning movement by the fan. This also produces an axially directed centrifugal force component, which is added to the axially directed force produced by the steam pressure in the thermostat 20 and which reinforces the coupling force created here by the friction disks 21, 22, and 39 by displacing the friction disk 39 against the back area of the friction disk 21.

If the cooling water temperature drops below about 70° C., the clutch cuts itself out. The operation repeats itself according the temperature in the cooling water circuit.

Figure 4:
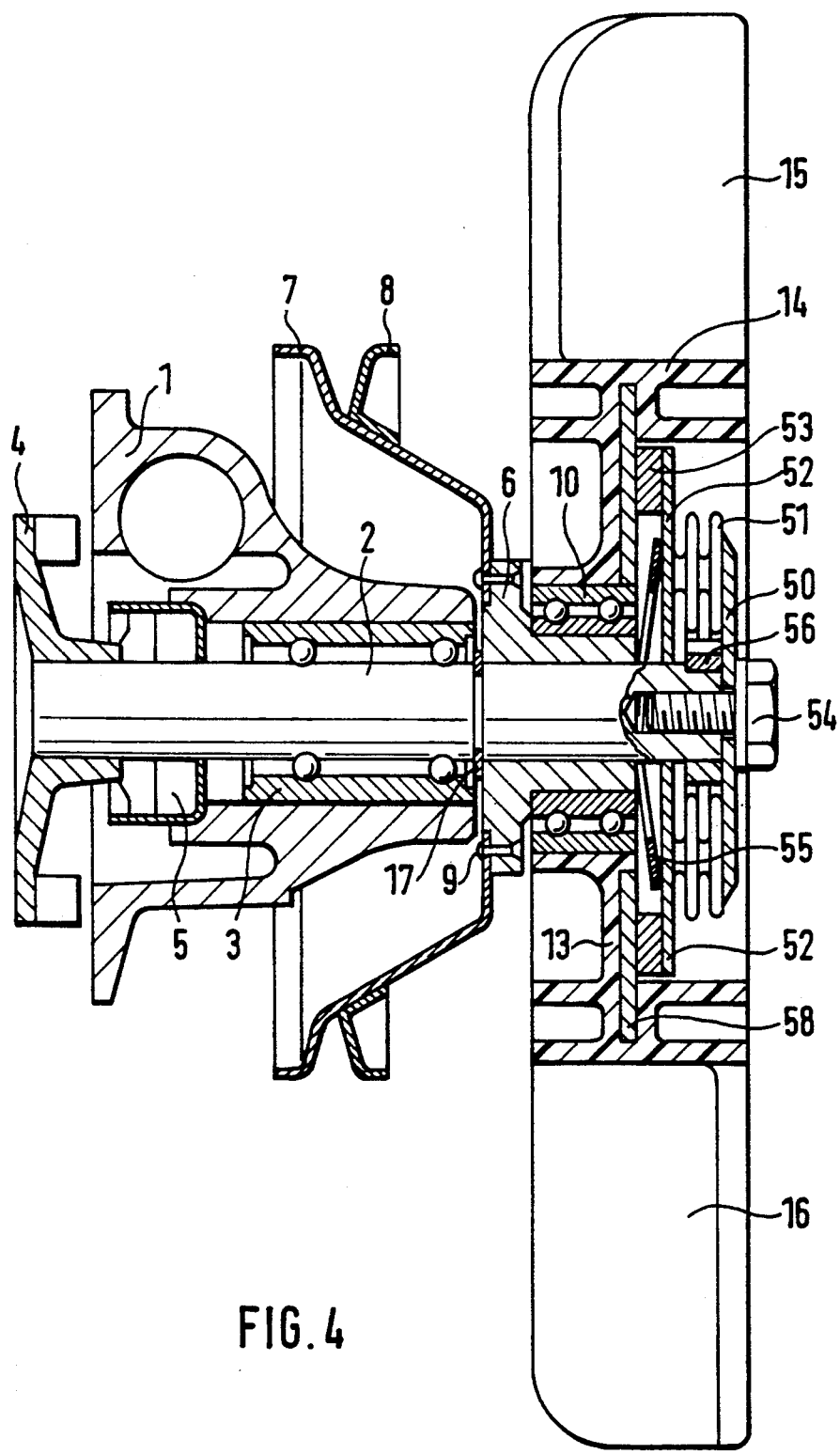
FIG. 4 an axial section of a fan whose coupling action is dependant on the temperature of the cooling air which passes above the thermostat, and FIG. 5 an axial section of a fan according to FIG. 4, with a device to reinforce the coupling forces.

In the embodiment of the automatically coupling fan shown in FIGS. 3 and 4, the design also largely agrees with that of FIGS. 1 to 3. Corresponding parts are again designated with the same reference numerals as in FIGS. 1 to 3. Thus structure and function need not be described again.

The basic difference in the embodiment of an automatic coupling fan shown in FIGS. 3 and 4 rests in the fact that the thermostat, configured as a gas-tight container, is secured on its solid wall 50 by means of a screw bolt 54 to the end of the water pump shaft 2 that supports the fan 13, 14, 15, 16, and is thus exposed to the flow of cooling air and not, as in the above-described examples, to the flow of cooling water. The design of the thermostat largely corresponds to that of FIGS. 1 and 2. It consists of a solid wall 50, the metal bellows with bellows shafts 51, and a flexible wall 52. While the solid wall 50 is rigidly connected to the water pump shaft 2 by means of a screw bolt 54 and is secured for rotation by means of a wedge 56, the flexible wall 52, which is firmly attached to the thermostat, is mounted on the water pump shaft 2 in such a way as to permit motion back and forth in the axial direction. A disk spring 55 rests against the flexible wall 52 and with its spring force determines the temperature range within which the flexible wall 52, with a friction part 53, will engage with the matching friction disk 58 of metal.

The matching friction disk 58 is injected in the single-piece thermoplastic parts of the fan, namely its blades 15 and 16, the outer fan part 14, and the hub 13. In other words, the fan hub 13 and the outer fan part 14 form one part of the clutch and can be molded from plastic in a single-piece.

The dimensions of the metal bellows, with bellows shafts 51, are such that in the temperature range under consideration the liquid filler is located exclusively in the area of the bellows shafts, and thus the effective bellows cross-section is free of liquid medium; and therefore when the fan is cut out but the water pump shaft 2 is turning, an axial force is not exerted on the flexible wall 52 of the thermostat. Which is to say, the same considerations apply here with respect to selecting the thermostat as those already discussed in connection with FIGS. 1 to 3.

In the embodiment of the automatically coupling fan according to FIG. 4, the solid wall 50 of the thermostat rests in the flow of the cooling air, while the thermostat rotates jointly with the water pump shaft 2 and is uncoupled by the fan 13, 14, 15, 16. When the cooling air temperature rises, the steam pressure of the filler within the thermostat also increases. The disk spring 55 determines the value at which the steam pressure within the effective bellows cross-sectional area exerts an axially directed pressure on the flexible wall 52 of the thermostat such that the clutch parts 53 and 58 engage and the fan turns along with the water pump shaft 2—and continues to turn until sufficient cooling is achieved and until the temperature of the cooling air flow drops below the switching temperature, the clutch members disengage, and the fan is uncoupled.

Figure 5:
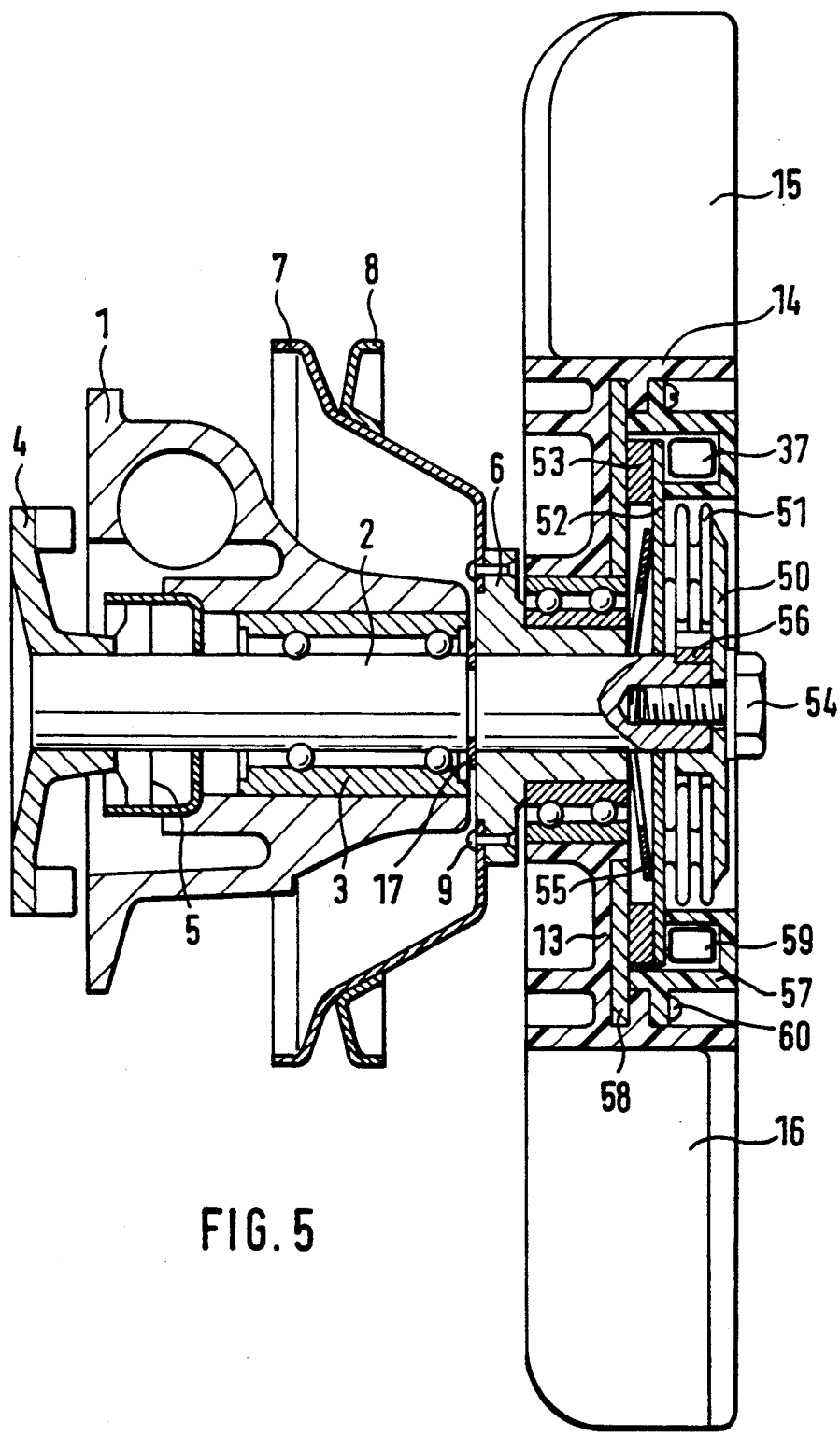

In the embodiment of the automatically coupling fan according to FIG. 5, the coupling force is reinforced by a plastic housing part 57 installed in the outer fan part 14, inserted into which part 57 is a circular tube 59 filled with liquid. When the clutch members 53 and 58 engage and the fan begins to turn, the liquid within the tube is subjected to a centrifugal force, whose axial component reinforces the contact pressure of the clutch parts 53 and 58.

What is claimed is:

1. Automatically coupling fan for a cooling system of an automobile comprising a thermostat mounted on a water pump shaft, said thermostat comprising a gas-tight container with a fixed wall and a flexible wall, containing a liquid filler having a vapor pressure which, within a predetermined temperature range, couples the fan to a drive shaft of the automobile by means of a friction clutch, wherein said thermostat comprises a metal bellows which rotates with the water pump shaft, said bellows having dimensions such that a ring of the liquid filler generated during rotation of the thermostat by centrifugal forces exerted on the liquid thermostat filler remains substantially outside the effective cross-section ($a_w$) of the bellows, wherein the fan is coupled in a predetermined temperature range substantially exclusively according to the vapor pressure of the liquid filler arising in the thermostat, wherein a part of the friction clutch connected to the fan comprises two circular friction surfaces positioned at a distance from each other, between which a clutch part connected to the rod projects, said clutch part being subjected to contact pressure on both of its surface when the fan is coupled.

2. Automatically coupling fan for a cooling system of an automobile comprising a thermostat mounted on a water pump shaft, said thermostat comprising a gas-tight container with a fixed wall and a flexible wall, containing a liquid filler having a vapor pressure which, within a predetermined temperature range, couples the fan to a drive shaft of the automobile by means of a friction clutch, wherein said thermostat comprises a metal bellows which rotates with the water pump shaft, said bellows having dimensions such that a ring of the liquid filler generated during rotation of the thermostat by centrifugal forces exerted on the liquid thermostat filler remains substantially outside the effective cross-section ($a_w$) of the bellows, wherein the fan is coupled in a predetermined temperature range substantially exclusively according to the vapor pressure of the liquid filler arising in the thermostat, wherein the fixed wall of the thermostat is rigidly connected to the water pump shaft, the flexible wall is longitudinally movable on the water pump shaft (2), the fixed wall of the thermostat is exposed to a flow of cooling air, and the flexible wall couples the fan to the water pump shaft by means of the friction clutch within a present temperature range.

3. Automatically coupling fan for a cooling system of an automobile comprising a thermostat mounted on a water pump shaft, said thermostat comprising a gas-tight container with a fixed wall and a flexible wall, containing a liquid filler having a vapor pressure which, within a predetermined temperature range, couples the fan to a drive shaft of the automobile by means of a friction clutch, wherein said thermostat comprises a metal bellows which rotates with the water pump shaft, said bellows having dimensions such that a ring of the liquid filler generated during rotation of the thermostat by centrifugal forces exerted on the liquid thermostat filler remains substantially outside the effective cross-section ($a_w$) of the bellows, wherein the fan is coupled in a predetermined temperature range substantially exclusively according to the vapor pressure of the liquid filler arising in the thermostat, wherein a body part of the fan supports a cooperating coupling part is furnished with a water ring and comprises a ring-shaped tube containing liquid, concentric with the water pump shaft, which rotates with the fan after fan coupling whereby the contact pressure of the clutch parts is reinforced by means of an axial component of centrifugal forces exerted on the rotating liquid-containing ring-shaped tube.

4. Automatically coupling fan as defined in claim 3, wherein a housing is provided for the tube, said housing being firmly connected to a hub of the fan.

5. Automatically coupling fan as defined in claim 4, wherein the housing comprises plastic.

6. Automatically coupling fan as defined in claim 4, wherein the fan hub comprises thermoplastic synthetic material.

7. Automatically coupling fan as defined in claim 4, wherein the fan hub the fan body part the blade parts are of single-piece design and comprise of thermoplastic synthetic material.

8. Automatically coupling fan as defined in claim 4, wherein the hub and clutch comprise thermoplastic synthetic material.

* * * * *